March 7, 1950 — O. T. BURNHAM — 2,500,059
MEASURING DISPENSER FOR GRANULATED MATERIAL
Filed Jan. 19, 1945
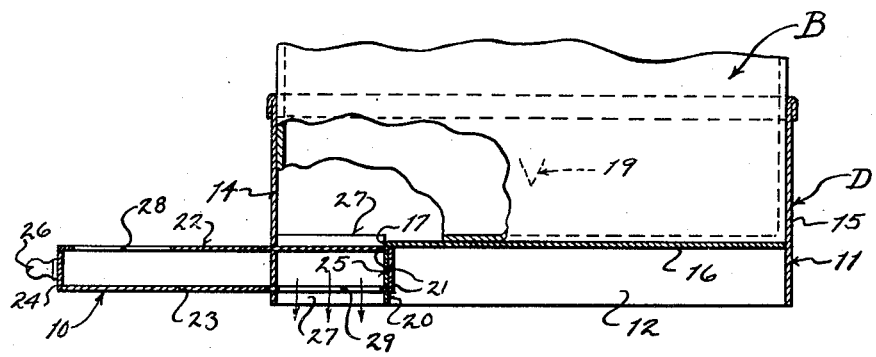
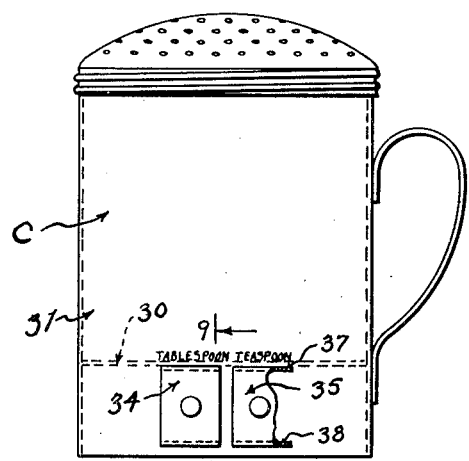
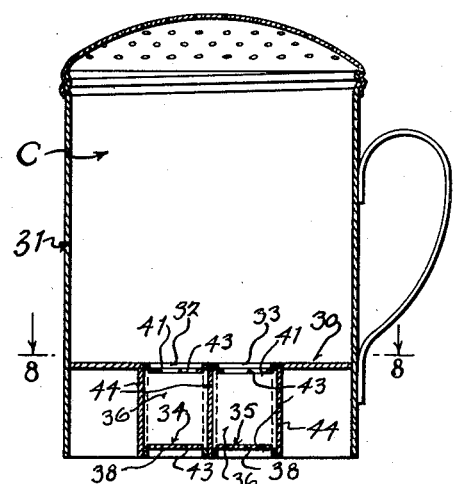
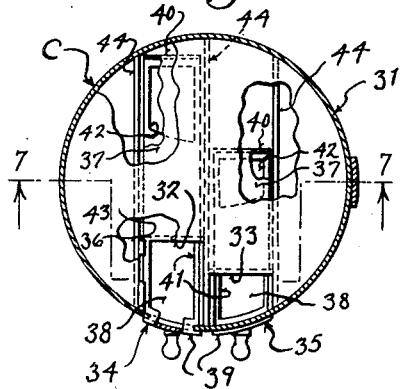
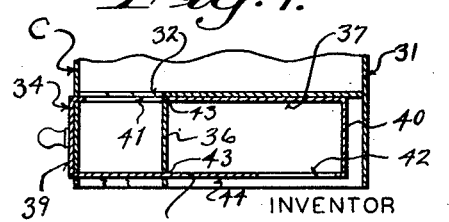
INVENTOR
OLIVER T. BURNHAM
BY
ATTORNEYS Patented Mar. 7, 1950

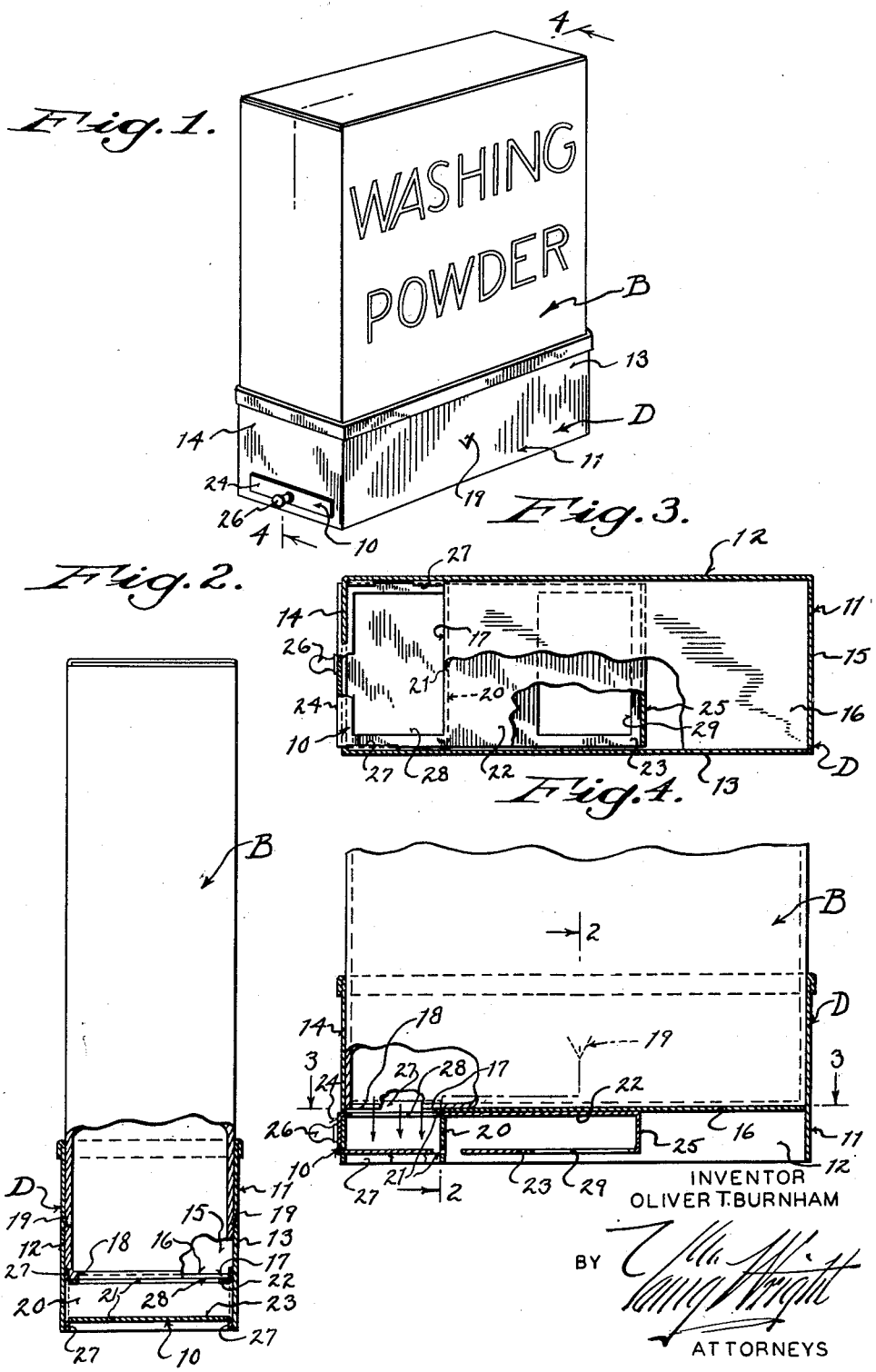

2,500,059

UNITED STATES PATENT OFFICE 2,500,059

MEASURING DISPENSER FOR GRANULATED MATERIAL

Oliver T. Burnham, Milwaukee, Wis.

Application January 19, 1945, Serial No. 573,496

1 Claim. (Cl. 222—451)

This invention appertains to containers and more particularly to means for dispensing a measured quantity of material from a package or other receptacle.

One of the primary objects of my invention is to provide a device which can be readily associated with a standard package or box for accurately dispensing a measured quantity of material therefrom (such as soap powder) upon each operation of the device, and quickly removed from said package or box.

Another salient object of my invention is to provide a device for granular or powdered material embodying a body portion for snugly receiving one end of the standard package or box and having in its lower end a sliding dispensing and measuring drawer for receiving the material through an opening from the package.

A further important object of my invention is to provide novel means for constructing and arranging the measuring drawer in the dispensing device whereby to insure the proper delivery of the material to the drawer and the cutting off of the supply of material when the drawer is pulled out for dispensing the measured quantity of material.

A still further object of my invention is to provide a means for insuring the delivery of all of the material through the bottom of the drawer when the drawer is pulled out to its dispensing position whereby the necessity of inverting the drawer to dump the material therefrom is eliminated.

A still further object of my invention is to provide a device for dispensing a measured quantity of material from a container which is of an extremely simple and durable character and one which can be placed upon the market at a reasonable cost.

With these and other objects in view the invention consists in the novel construction, arrangement, and formation of parts, as will be hereinafter more fully described, claimed and illustrated in the accompanying drawings, in which drawings:

Figure 1 is a perspective view of my novel dispensing device associated with a conventional package of soap powder.

Figure 2 is a side elevational view partly in section, the section being taken substantially on the line 2—2 of Figure 4.

Figure 3 is a horizontal sectional view taken on the line 3—3 of Figure 4, looking in the direction of the arrows.

Figure 4 is a vertical sectional view taken on the line 4—4 of Figure 1, looking in the direction of the arrows, with part of the bottom wall broken away.

Figure 5 is a view similar to Figure 4 but showing the dispensing and measuring drawer in its open position for permitting the dispensing of the material through the bottom thereof.

Figure 6 is a front elevational view showing the principles of my novel dispensing device incorporated directly in a kitchen article such as a salt shaker.

Figure 7 is a vertical sectional view through the salt shaker with my novel dispensing device incorporated therewith, the section being taken substantially on the line 7—7 of Figure 8 looking in the direction of the arrows.

Figure 8 is a horizontal sectional view taken on the line 8—8 of Figure 7, looking in the direction of the arrows.

Figure 9 is a fragmentary vertical section taken at right angles to Figure 7 and substantially on the line 9—9 of Figure 6, looking in the direction of the arrows.

Referring to the drawings in detail, wherein similar reference characters designate corresponding parts throughout the several views, the letter D generally indicates my dispensing device and B a standard package or box with which my dispensing device D can be associated.

The package or box B can be of the type now found in grocery stores and containing soap powder or a similar product. There is a definite need for a simple and inexpensive device for delivering measured quantities of soap powder to washing machines, dish pans and the like. The usual practice of the housewife is to open one corner of the package and then shake the soap powder into the dish water or into the clothes washing machine. Usually too little or too much powder is shaken into the dish water or washing machine and the housewife never knows for a certainty exactly how much powder has been used.

My device D is adapted to be associated with such a package so that upon each operation of a measuring drawer 10 a certain quantity of soap powder will be dispensed. Obviously, the drawer 10 can be slid back and forth the desired number of times to obtain the correct quantity of powder and the drawer can be made in any desired size such as for holding one tablespoon full of the powder.

My device D includes a body portion 11 adapted to snugly receive one end of the package or box B, and this body can be formed from any desired material. In the present instance, I have shown the body fabricated from sheet metal and this body includes longitudinally extending spaced side walls 12 and 13 and end walls 14 and 15. Horizontal partition plate or bottom wall 16 is secured to the side and end walls and limits the insertion of the package into the body. For a purpose which will later appear, the wall 16 is spaced from the lower edge of the bottom of the body. The partition or bottom wall 16 adjacent to the end wall 14 is provided with a dispensing opening 17, and this opening is adapted to aline with an opening 18 in the package or box B. Initially, the opening 18 is formed by tearing out one corner of the box and the body 11 is then slipped over the box so that the opening 17 will register with the opening 18 after which the box and the body can be inverted so that the device D will be lowermost. If preferred, prongs 19 can be stamped out of the side walls 12 and 13 of the dispensing device for digging into the package or box B so as to prevent the displacement of the device D from the box.

Depending from the partition wall 16 at the inner end of the opening 17 is a transversely extending flange 20 and this flange can be formed directly on the partition. The flange 20 and the front wall 14 are each provided with a pair of slots 21, and these slots slidably receive the top and bottom walls 22 and 23 of the measuring slide drawer 10. The slide drawer is preferably formed from a single piece of sheet metal, and this metal is stamped and folded to provide the spaced top and bottom walls 22 and 23 and the front and rear end walls 24 and 25. It is to be noted, that in Figure 4 the bottom wall 23 of the drawer 10 is broken away near the flange 20 to illustrate structural detail. The front wall 24 can be provided with any preferred type of hand pull 26. It can be seen that the flange 20 and the end wall 14 of the body 11 provide a guide and support for the drawer 10, and if so desired, guide strips 27 can be secured to the inner faces of the side walls 12 and 13 to form additional guides for the drawer and these strips also serve the function of preventing the creeping of material between the drawer and the side walls of the body. The top wall 22 of the drawer is provided with an entrance opening 28, which is adapted to register with the openings 17 and 18 when the drawer is in its closed position, as is clearly shown in Figure 4. The bottom wall 23 of the drawer adjacent to its rear end is provided with an outlet opening 29 through which the material is adapted to flow when the drawer is in its open position as shown in Figure 5. At this point it may be noted that the measuring compartment in the drawer is defined by the flange 20, the lower portion of the front wall 14 of the body 11, the side walls 12 and 13 of the body and the forward portion of the bottom wall 23 of the drawer.

Where the body is made of sheet metal, the upper edge thereof can be rolled, so as to strengthen the body and to eliminate the formation of sharp edges.

In use of my dispensing device D the same is associated with the package or box B in the manner heretofore described and the powder or other material in the box will flow out of the box opening 18 through the openings 17 and 28 and into the drawer 10 forwardly of the flange 20.

When it is desired to dispense the measured quantity of material the drawer is pulled out and the material is held against rearward movement by the flange 20 which scrapes the material over the bottom wall 23 of the drawer and against forward movement by the lower edge of the lowermost slot 21 formed in the front wall 14 of the body. When the opening 29 in the bottom of the drawer rides in front of the flange, obviously the material will drop through said opening and into the place desired. The drawer can be operated as many times as is desired so that the exact quantity of powder or other material can be obtained.

In Figures 6 to 9, inclusive, I have shown the principles of my device incorporated directly in the body portion of a receptacle or container C. This container can be a salt cellar or the like as shown but obviously the receptacle can be of any type for receiving any desired material such as sugar, coffee, baking soda, etc. As illustrated, the salt cellar is of the shaker type and the bottom wall 30 thereof is spaced a considerable distance above the lower edge of the side wall 31 of the shaker. The bottom wall is provided with spaced dispensing openings 32 and 33 of different sizes, and I can provide two different sized dispensing drawers indicated respectively by the reference characters 34 and 35. The drawers are of different capacities and the larger drawer can be used for dispensing a tablespoonful of the material and the drawer 35 can be utilized for dispensing a teaspoonful of material. The rear edges of each of the openings 32 and 33 carry respectively depending flanges 36 which extend into the drawers. The drawers are of identical construction other than the capacity thereof, and hence, each includes top and bottom walls 37 and 38 connected by front and rear walls 39 and 40. The side wall 31 of the shaker and its bottom wall 30 carry spaced guide strips 44, which define the sides of the drawer. The upper wall of each drawer is provided with an opening 41 which registers with its opening in the bottom wall of the salt shaker when the drawers are in their closed position. The bottom wall of each drawer adjacent to its rear end is provided with the outlet or dumping opening 42. The dispensing device functions in the same manner as shown and described for my dispensing device D, and it is to be noted that both of the flanges 36 and the wall of the shaker are provided with pairs of guide slots 43 for the top and bottom walls of the drawers 34 and 35.

The material flows into drawers through the openings 32, 33 and 41 and when a drawer is pulled open, the material is held by the flange 36 until the opening 42 rides in front of the flange at which time the material will be dumped. In both forms of my invention when a drawer is opened the top wall forms a closure so as to prevent the further flow of material into the drawers.

From the foregoing description it can be seen that I have provided an exceptionally simple and durable form of dispensing a measured quantity of material from packages or other containers or receptacles.

Changes in details may be made without departing from the spirit or the scope of my invention, but what I claim as new is:

An attachment for standard packages of soap powder and the like comprising a hollow body adapted to snugly receive one end of the package, said body including a side, an end and a bottom wall, said bottom wall being spaced from the upper and lower edges of the side and end walls, said bottom wall engaging one end wall of the package for limiting the insertion of the package in the body and said bottom wall having an opening in its forward end adapted to register with an opening in the mentioned end of the package, a dependent flange on said bottom wall disposed at one side of the opening in the bottom wall, said flange and said end wall of the body having pairs of aligned slots therein, and a drawer slidably associated with said body in the space in the body below the bottom wall having top and bottom walls slidably mounted in said slots, said top wall having a material receiving opening therein adjacent to its front end adapted to register with the opening in the bottom wall, when the drawer is closed whereby material can flow into said drawer and having a discharge opening therein adjacent to its rear end through which material is adapted to be discharged when the drawer is in its open position, the top wall of the drawer forming a closure for the opening in the bottom wall of the body when the drawer is in its open position.

OLIVER T. BURNHAM.

REFERENCES CITED

The following references are of record in the file of this patent:

UNITED STATES PATENTS

| Number | Name | Date |
|---|---|---|
| 134,928 | Price et al. | Jan. 14, 1873 |
| 2,318,676 | Deland | May 11, 1943 |